(12) United States Patent
Mobasher et al.

(10) Patent No.: US 10,860,399 B2
(45) Date of Patent: *Dec. 8, 2020

(54) PERMUTATION BASED STRESS PROFILE COMPRESSION

(71) Applicant: Samsung Display Co., Ltd., Yongin-si (KR)

(72) Inventors: Amin Mobasher, San Jose, CA (US); Jalil Kamali, San Jose, CA (US); Shiva Moballegh, Campbell, CA (US); Gregory W. Cook, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

This patent is subject to a terminal disclaimer.

(21) Appl. No.: 15/980,623

(22) Filed: May 15, 2018

(65) Prior Publication Data
US 2019/0289308 A1 Sep. 19, 2019

Related U.S. Application Data

(60) Provisional application No. 62/643,630, filed on Mar. 15, 2018.

(51) Int. Cl.
*G06F 11/00* (2006.01)
*G09G 3/20* (2006.01)
*G09G 3/3233* (2016.01)

(52) U.S. Cl.
CPC ............ *G06F 11/004* (2013.01); *G09G 3/20* (2013.01); *G09G 3/3233* (2013.01);
(Continued)

(58) Field of Classification Search
CPC ............ G06F 11/004; G09G 2320/043; G09G 2320/045; G09G 2320/048
See application file for complete search history.

(56) References Cited

U.S. PATENT DOCUMENTS

| 5,539,468 A | 7/1996 | Suzuki et al. |
| 6,137,914 A | 10/2000 | Ligtenberg et al. |

(Continued)

FOREIGN PATENT DOCUMENTS

| KR | 10-2015-0034948 | 4/2015 |
| KR | 10-2019-0060909 A | 6/2019 |

OTHER PUBLICATIONS

Kang, Wei, et al., "Compressing Encrypted Data: A Permutation Approach", Fiftieth Annual Allerton Conference Allerton House, UIUC, Illinois, USA, Oct. 2012 (IEEE), (5 pages).

(Continued)

*Primary Examiner* — William Spieler
(74) *Attorney, Agent, or Firm* — Lewis Roca Rothgerber Christie LLP

(57) ABSTRACT

A system and method for operating a display. In some embodiments, the method includes: permuting elements of a stress profile for a slice of the display, with a first permutation, to form a permuted stress profile; compressing the permuted stress profile to form a compressed permuted stress profile; decompressing the compressed stress profile to form a decompressed permuted stress profile; and permuting elements of the decompressed permuted stress profile, with a second permutation, to form a decompressed stress profile, the second permutation being an inverse of the first permutation.

20 Claims, 9 Drawing Sheets

(52) U.S. Cl.
CPC .............. *G09G 2320/0233* (2013.01); *G09G 2320/0285* (2013.01); *G09G 2320/043* (2013.01); *G09G 2320/045* (2013.01); *G09G 2320/048* (2013.01)

(56) References Cited

U.S. PATENT DOCUMENTS

| | | |
|---|---|---|
| 6,243,416 B1 | 6/2001 | Matsushiro et al. |
| 6,668,086 B1 | 12/2003 | Enokida |
| 6,819,793 B1 | 11/2004 | Reshetov et al. |
| 7,202,912 B2 | 4/2007 | Aneja et al. |
| 7,236,636 B2 | 6/2007 | Sakai et al. |
| 7,321,693 B2 | 1/2008 | Kadowaki |
| 7,576,888 B2 | 8/2009 | Sakai et al. |
| 7,619,596 B2 | 11/2009 | Tada |
| 7,750,938 B2 | 7/2010 | Grimes et al. |
| 7,974,478 B2 | 7/2011 | Bashyam et al. |
| 8,452,083 B2 | 5/2013 | Kambegawa |
| 8,478,057 B1 | 7/2013 | Cui et al. |
| 8,509,532 B2 | 8/2013 | Ushiku |
| 8,533,166 B1 | 9/2013 | Sulieman et al. |
| 8,553,301 B2 | 10/2013 | Tamura |
| 8,599,925 B2 | 12/2013 | Srinivasan |
| 8,659,793 B2 | 2/2014 | Takeishi |
| 8,660,347 B2 | 2/2014 | Tamura |
| 8,994,617 B2 | 3/2015 | Chaji et al. |
| 8,995,763 B2 | 3/2015 | Clark |
| 9,378,560 B2 | 6/2016 | Iourcha et al. |
| 9,495,894 B2 | 11/2016 | Yamanaka et al. |
| 9,584,696 B2 | 2/2017 | Beck |
| 9,697,765 B2 | 7/2017 | Chung et al. |
| 9,715,716 B2 | 7/2017 | Song et al. |
| 9,773,455 B2 | 9/2017 | Chung et al. |
| 9,812,067 B2 | 11/2017 | Yang et al. |
| 9,830,890 B2 | 11/2017 | Zhou et al. |
| 9,894,379 B2 | 2/2018 | Banerji et al. |
| 9,905,162 B2 | 2/2018 | Yoo |
| 9,966,035 B2 | 5/2018 | Kim et al. |
| 10,515,612 B2 | 12/2019 | Mobasher et al. |
| 2003/0043088 A1* | 3/2003 | Booth, Jr. ............ G09G 3/3208 345/45 |
| 2004/0061672 A1* | 4/2004 | Page ................... G09G 3/3216 345/82 |
| 2005/0225548 A1 | 10/2005 | Han et al. |
| 2005/0280766 A1* | 12/2005 | Johnson ............... G09G 3/3216 349/167 |
| 2008/0048951 A1* | 2/2008 | Naugler, Jr. .......... G09G 3/006 345/82 |
| 2008/0317362 A1 | 12/2008 | Hosaki et al. |
| 2009/0052772 A1 | 2/2009 | Speirs et al. |
| 2009/0066613 A1 | 3/2009 | Nakamura et al. |
| 2009/0148059 A1 | 6/2009 | Matsuda |
| 2010/0257493 A1 | 10/2010 | Agarwal et al. |
| 2010/0316137 A1 | 12/2010 | Long et al. |
| 2011/0069076 A1 | 3/2011 | Lindholm et al. |
| 2011/0148894 A1 | 6/2011 | Duprat et al. |
| 2011/0188750 A1 | 8/2011 | Tamura |
| 2011/0243469 A1 | 10/2011 | McAllister et al. |
| 2012/0120043 A1 | 5/2012 | Cho et al. |
| 2012/0147799 A1 | 6/2012 | Nagara et al. |
| 2012/0320067 A1 | 12/2012 | Iourcha et al. |
| 2013/0170558 A1 | 7/2013 | Zhang |
| 2014/0055500 A1* | 2/2014 | Lai ...................... G09G 3/3208 345/690 |
| 2014/0160172 A1 | 6/2014 | Lee |
| 2014/0168192 A1 | 6/2014 | Jeong et al. |
| 2014/0176409 A1 | 6/2014 | Kim et al. |
| 2014/0313360 A1 | 10/2014 | Lee et al. |
| 2015/0002378 A1 | 1/2015 | Nathan et al. |
| 2015/0015590 A1 | 1/2015 | Jeong et al. |
| 2015/0117774 A1 | 4/2015 | Yang et al. |
| 2015/0194096 A1* | 7/2015 | Chung ................. G09G 3/3275 345/78 |
| 2015/0243201 A1 | 8/2015 | Chung et al. |
| 2016/0104411 A1 | 4/2016 | Nathan et al. |
| 2016/0372033 A1 | 12/2016 | Yoo |
| 2016/0373788 A1 | 12/2016 | Gamei et al. |
| 2016/0379550 A1* | 12/2016 | Jiang ................... G09G 3/3208 345/520 |
| 2017/0122725 A1 | 5/2017 | Yeoh et al. |
| 2017/0256024 A1 | 9/2017 | Abraham et al. |
| 2019/0289308 A1 | 9/2019 | Mobasher et al. |

OTHER PUBLICATIONS

EPO Extended Search Report dated May 2, 2019, for corresponding European Patent Application No. 19162833.8 (15 pages).
Burrows, M., et al., "A Block-sorting Lossless Data Compression Algorithm", SRC Research Report 124, May 10, 1994, 24 pages, d i g i t a l Systems Research Center, Palo Alto, California.
"Burrows-Wheeler Transform CMSC 423", 2009, 26 pages.
EPO Extended Search Report dated Mar. 6, 2020, for corresponding European Patent Application No. 19191346.6, 8 pages.
Office Action issued in U.S. Appl. No. 16/292,181 by the USPTO, dated Apr. 9, 2020, 7 pages.
Syahrul, Elfitrin, et al., "Lossless Image Compression Using Burrows Wheeler Transform (Methods and Techniques)", 2008 IEEE International Conference on Signal Image Technology and Internet Based Systems, 2008, pp. 338-343.
Notice of Allowance issued in U.S. Appl. No. 15/983,014 by the USPTO, dated Aug. 28, 2019, 7 pages.
Partial European Search Report for corresponding European Patent Application No. 20169950.1, dated Aug. 3, 2020, 31 pages.

* cited by examiner

PERMUTATION BASED STRESS PROFILE COMPRESSION

CROSS-REFERENCE TO RELATED APPLICATION(S)

The present application claims priority to and the benefit of U.S. Provisional Application No. 62/643,630, filed Mar. 15, 2018, entitled "PERMUTATION BASED STRESS PROFILE COMPRESSION", the entire content of which is incorporated herein by reference.

FIELD

One or more aspects of embodiments according to the present disclosure relate to stress compensation in a display, and more particularly to a system and method for mitigating the effects of truncation errors when employing compressed storage of stress profiles.

BACKGROUND

Compensation for output decline in a video display such as an organic light-emitting diode (OLED) display may be used to preserve image quality as a display ages. The data used to perform such compensation may be stored in compressed form to reduce memory requirements; however, errors in such compressed data may accumulate unevenly resulting in loss of image quality.

Thus, there is a need for an improved system and method for stress compensation.

SUMMARY

According to an embodiment of the present disclosure there is provided a method for operating a display, the method including: permuting elements of a stress profile for a slice of the display, with a first permutation, to form a permuted stress profile; compressing the permuted stress profile to form a compressed permuted stress profile; decompressing the compressed permuted stress profile to form a decompressed permuted stress profile; and permuting elements of the decompressed permuted stress profile, with a second permutation, to form a decompressed stress profile, the second permutation being an inverse of the first permutation.

In one embodiment, the first permutation is a circular shift.

In one embodiment, the first permutation is a circular shift by a constant amount.

In one embodiment, the first permutation is a circular shift by a pseudorandom amount.

In one embodiment, the method includes: storing the compressed permuted stress profile in a memory, and storing the pseudorandom amount in the memory.

In one embodiment, the method includes: generating the pseudorandom amount by a first pseudorandom number generator; permuting elements of the stress profile, with the first permutation, based on the pseudorandom amount generated by the first pseudorandom number generator; generating the pseudorandom amount by a second pseudorandom number generator; and permuting elements of the decompressed permuted stress profile, with the second permutation, based on the pseudorandom amount generated by the second pseudorandom number generator.

In one embodiment, the stress profile is a first stress profile for a first slice of the display, the permuted stress profile is a first permuted stress profile, the compressed permuted stress profile is a first compressed permuted stress profile, the decompressed permuted stress profile is a first decompressed permuted stress profile, the decompressed stress profile is a first decompressed stress profile, and the method includes: permuting elements of a second stress profile for a second slice of the display, with a third permutation, to form a second permuted stress profile; compressing the second permuted stress profile to form a second compressed permuted stress profile; decompressing the second compressed permuted stress profile to form a second decompressed permuted stress profile; and permuting elements of the second decompressed permuted stress profile, with a fourth permutation, to form a second decompressed stress profile, the fourth permutation being an inverse of the third permutation, wherein the third permutation is a circular shift by an amount calculated from the pseudorandom amount.

In one embodiment, the first permutation is a reversal of order of elements of the stress profile.

In one embodiment, the reversal of order of elements of the stress profile is a reversal of order in a direction parallel to lines of the display.

In one embodiment, the first permutation is: a reversal of order of elements of the stress profile when a randomly generated bit has a value of one, and an identity permutation when the randomly generated bit has a value of zero.

According to an embodiment of the present disclosure there is provided a system for performing stress compensation in a display, the system including: a memory; and a processing circuit configured to: permute elements of a stress profile for a slice of the display, with a first permutation, to form a permuted stress profile; compress the permuted stress profile to form a compressed permuted stress profile; decompress the compressed permuted stress profile to form a decompressed permuted stress profile; and permute elements of the decompressed permuted stress profile, with a second permutation, to form a decompressed stress profile, the second permutation being an inverse of the first permutation.

In one embodiment, the first permutation is a circular shift.

In one embodiment, the first permutation is a circular shift by a constant amount or by a pseudorandom amount.

In one embodiment, the processing circuit is further configured to: store the compressed permuted stress profile in the memory, and store the pseudorandom amount in the memory.

In one embodiment, the processing circuit is further configured to: generate the pseudorandom amount by a first pseudorandom number generator; permute elements of the stress profile, with the first permutation, based on the pseudorandom amount generated by the first pseudorandom number generator; generate the pseudorandom amount by a second pseudorandom number generator; and permute elements of the decompressed permuted stress profile, with the second permutation, based on the pseudorandom amount generated by the second pseudorandom number generator.

In one embodiment, the first permutation is a reversal of order of elements of the stress profile.

In one embodiment, the reversal of order of elements of the stress profile is a reversal of order in a direction parallel to lines of the display.

In one embodiment, the first permutation is: a reversal of order of elements of the stress profile when a randomly generated bit has a value of one, and an identity permutation when the randomly generated bit has a value of zero.

According to an embodiment of the present disclosure there is provided a display, including: a display panel; a memory; and a processing circuit configured to: permute elements of a stress profile for a slice of the display, with a first permutation, to form a permuted stress profile; compress the permuted stress profile to form a compressed permuted stress profile; decompress the compressed permuted stress profile to form a decompressed permuted stress profile; and permute elements of the decompressed permuted stress profile, with a second permutation, to form a decompressed stress profile, the second permutation being an inverse of the first permutation.

In one embodiment, the first permutation is a circular shift.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for permutation based stress profile compression provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Certain kinds of video displays may have characteristics that change with use. For example, an organic light-emitting diode (OLED) display may include a display panel having a plurality of pixels, each consisting of several subpixels (e.g., a red subpixel, a green subpixel, and a blue subpixel), and each of the subpixels may include an organic light-emitting diode configured to emit a different respective color. Each organic light-emitting diode may have an optical efficiency that declines with use, so that, for example, after the organic light-emitting diode has been in operation for some time, the optical output at a certain current may be lower than it was, at the same current, when the organic light-emitting diode was new.

This reduction in optical efficiency may result in dimming of parts of a display panel that have on average, during the life of the display, displayed brighter portions of the displayed images than other parts of the display. For example, a display used to view largely unchanging images from a security camera, the field of view of which contains a scene having a first portion which is sunlit, and relatively bright, during most of the day, and a second portion which is in the shade and relatively dim, during most of the day, may eventually show a more significant decrease in optical efficiency in the first portion than in the second portion. The fidelity of image reproduction of such a display may degrade over time as a result. As another example, a display that is used part of the time to display white text at the bottom of the image, separated by a black margin from the rest of the image, may experience a lower reduction of optical efficiency in the black margin than in other parts of the display panel, so that if the display is later used in a mode in which a scene fills the entire display panel, a brighter band may appear where the black margin was previously displayed (image sticking).

Figure 1:
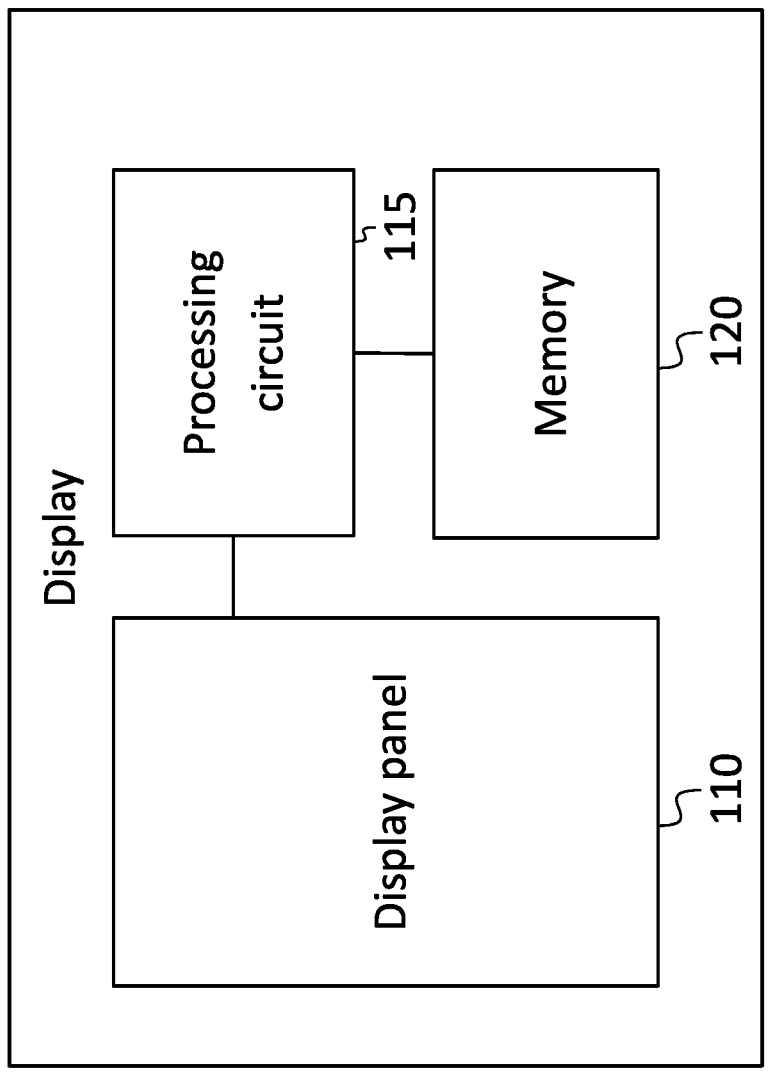
FIG. 1 is a block diagram of a display, according to an embodiment of the present disclosure.

To reduce the effect of such non-uniformities in the optical efficiency of a display, a display may include features to compensate for the reduction of optical efficiency resulting from use of the display. Referring to FIG. 1, such a display may include the display panel 110, a processing circuit 115 (discussed in further detail below), and a memory 120. The contents of the memory, which may be referred to as a "stress profile" or "stress table" for the display, may be a table of numbers (or "stress values") indicating (or from which may be inferred) the amount of stress each sub-pixel has been subjected to during the life of the display. The "stress" may be the total (time-integrated) drive current that has flowed through the sub-pixel during the life of the display, i.e., the total charge that has flowed through the sub-pixel during the life of the display. For example, the memory may accumulate one number for each sub-pixel; each time a new image is displayed, e.g., as part of a continuous stream of images together forming displayed video (or less frequently, as described below, to reduce the burden on the stress compensation system), the drive current for each sub-pixel in the image may be measured and a number indicating the current or brightness of the subpixel may be added to the respective number for that sub-pixel in the memory. In a display having a timing controller and a plurality of driver integrated circuits, the processing circuit may be, or may be part of, one or more of the driver integrated circuits. In some embodiments, each driver integrated circuit is responsible for driving a portion of the display panel, and it may accordingly perform stress tracking and stress compensation for that portion, independently of the other driver integrated circuits.

During operation, the drive current to each sub-pixel may be adjusted to compensate for an estimated loss of optical efficiency, the estimated loss of optical efficiency being based on the lifetime stress of the sub-pixel. For example the drive current to each sub-pixel may be increased in accordance with (e.g., in proportion to) the estimated loss of optical efficiency of the sub-pixel accumulated in the memory, so that the optical output may be substantially the same as it would have been had the optical efficiency of the sub-pixel not been reduced, and had the drive current not been increased. A non-linear function based on empirical data or a model of the physics of the sub-pixel may be used to infer or predict the loss of optical efficiency expected to be present, based on the lifetime stress of the sub-pixel. The calculations of the predicted loss of optical efficiency, and of the accordingly adjusted drive current, may be performed by the processing circuit.

Figure 2:
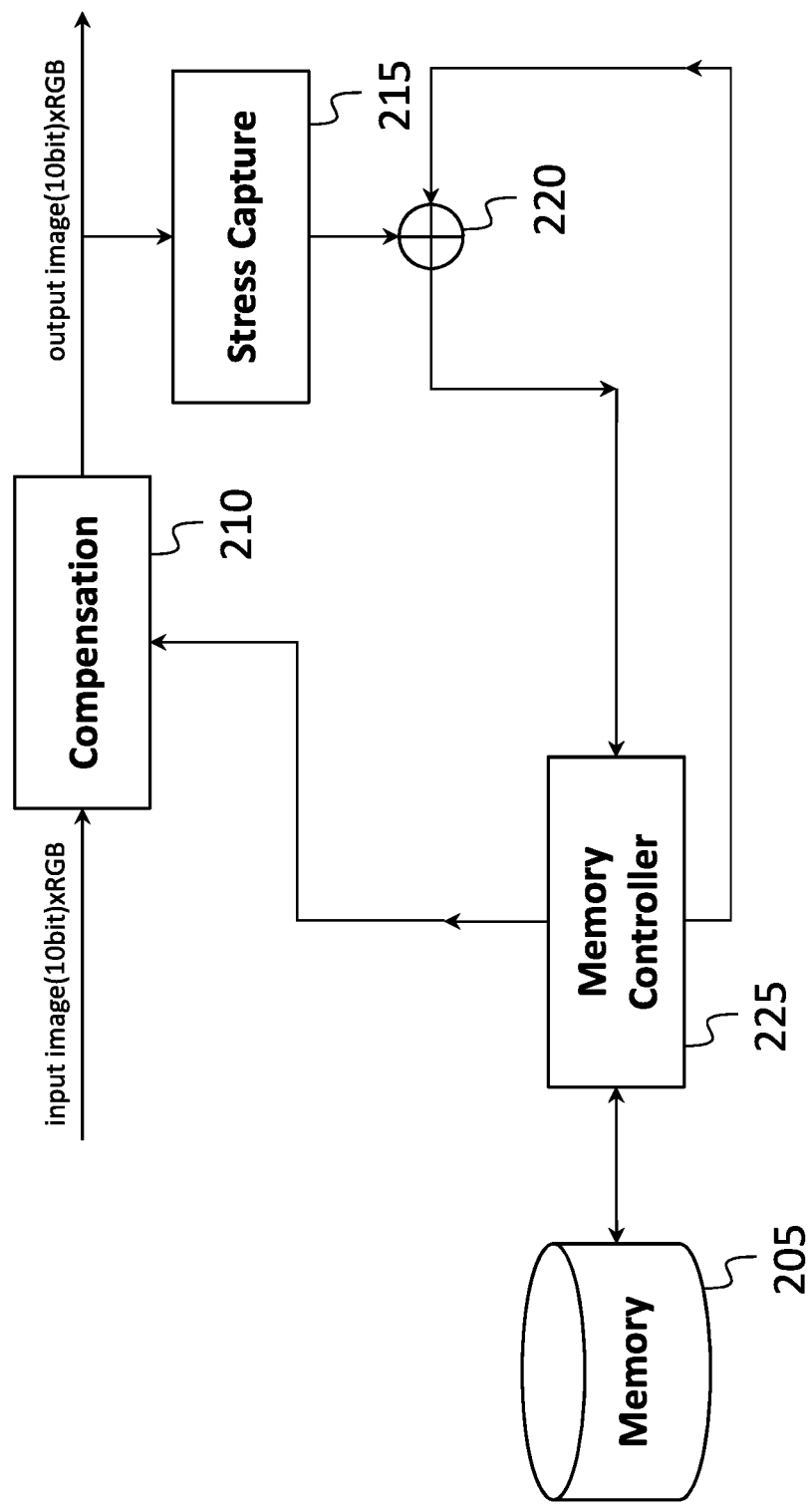
FIG. 2 is a block diagram of a system for stress compensation without compression, according to an embodiment of the present disclosure.

FIG. 2 shows a block diagram of a system for stress compensation. The stress table is stored in the memory 205. In operation, stress values are read out of the stress table and used by a drive current adjustment circuit 210 ("Compensation" block), to calculate adjusted drive current values, each adjusted drive current value being a raw drive current value (based on the desired optical output of the sub-pixel), adjusted according to the accumulated stress of the sub-pixel. The adjusted drive current values (which represent the current rate of accumulation of stress of the sub-pixels being displayed) are read by a sub-pixel stress sampling circuit 215 ("Stress Capture" block) and each previously stored stress value is increased (or "augmented"), in an adding circuit 220, by the current rate of accumulation of stress (i.e., by a number proportional to the adjusted drive current value), and saved back to the memory 205. A memory controller 225 controls read and write operations in the memory, feeds the stress values from the memory to the drive current adjustment circuit 210 and to the adding circuit 220 as needed, and stores the augmented stress values (having been augmented by the addition of the current rate of accumulation of stress) back into memory.

Tracking the total stress of each sub-pixel may require a significant amount of memory. For example, for a display with 1920×1080 pixels, with three sub-pixels per pixel, and with the stress of each sub-pixel stored as a 4-byte (32-bit) number, the size of the memory required may be approximately 25 megabytes. Moreover, the computational burden of updating each stress number for each frame of video (i.e., for each displayed image) may be significant.

Various approaches may be used to reduce the burden of tracking, and correcting for the reduction in optical efficiency resulting from, sub-pixel stress. For example, the sub-pixel stress sampling circuit 215 may sample only a subset of the adjusted drive current values in each image (i.e., in each frame of video). For example, in a display having 1080 lines (or rows) of pixels, in some embodiments only one row of the stress table is updated per frame of video. The discarding of the intervening 1079 adjusted drive current values, between pairs of adjusted drive current values that are taken into account, for any sub-pixel may result in only a small, acceptable loss of accuracy in the resulting stress values (as a measure of the lifetime stress of the sub-pixel) if, for example, the scene changes relatively slowly in the video being displayed.

In another embodiment, the sub-pixel stress sampling circuit 215 may in addition sample only at subset of frames. For example, in a display having 1080 lines (or rows) with refresh rate of 60 Hz (showing 60 frames per minute), the stress sampling circuit 215 samples all or partial drive current values in the image once every 10 frames and the stress table is updated accordingly.

Figure 3:
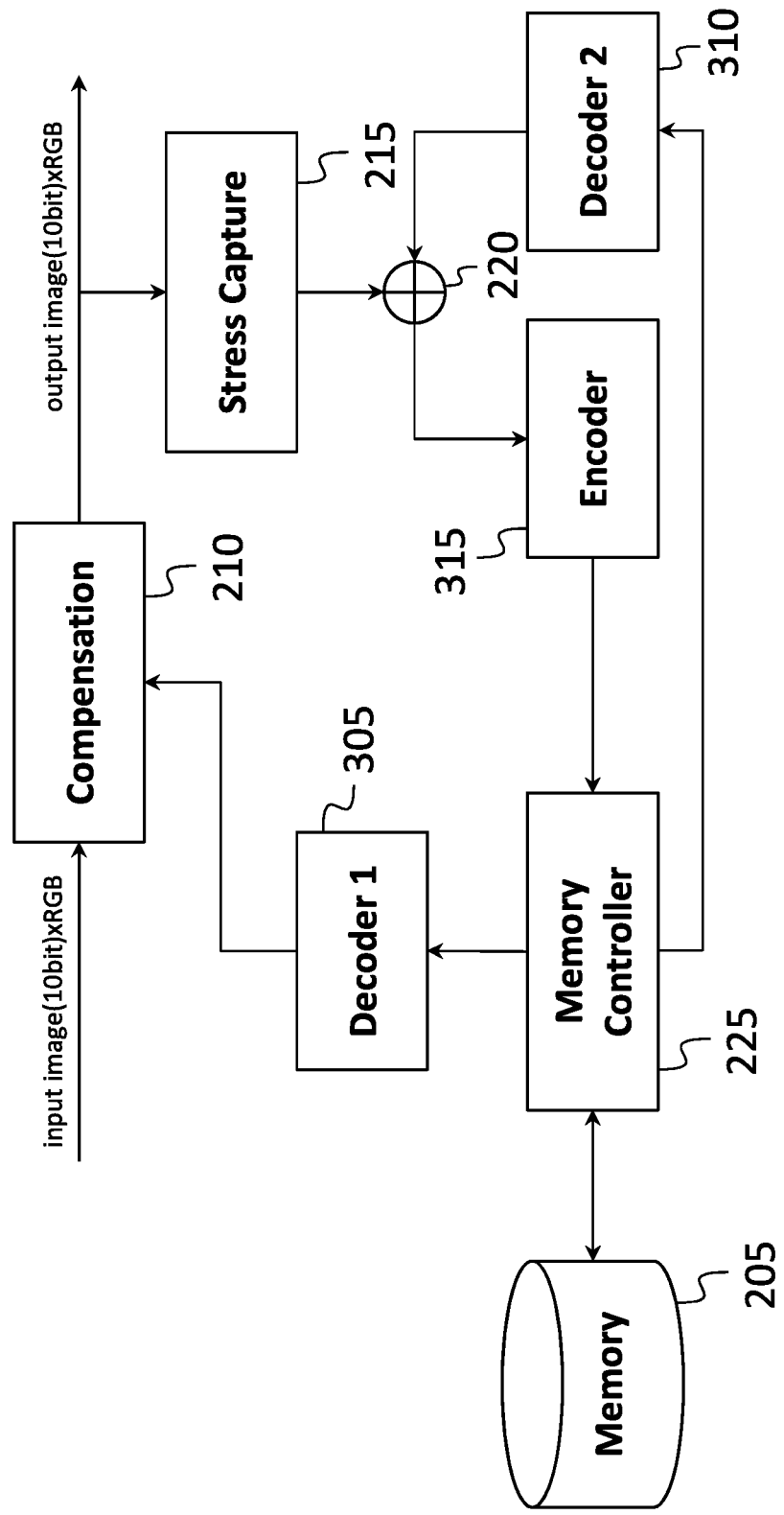
FIG. 3 is a block diagram of a system for stress compensation with compression, according to an embodiment of the present disclosure.

Various approaches may also be used to reduce the memory size required for storing sub-pixel stress in the stress table. For example the memory on the stress profile chipset may be reduced by compressing the data stored in the memory. Referring to FIG. 3, in some embodiments, a compressed representation of the stress table is stored in the memory 205; the compressed stress data are decompressed by a first decoder 305 before being fed to the drive current adjustment circuit 210. The compressed stress data are decompressed by a second decoder 310 before being sent to the adding circuit 220, and the augmented stress values are encoded, or compressed, by an encoder 315, before being stored in the memory 205. The encoder 315 encodes data that it receives in a manner that compresses it, and each of the first decoder 305 and the second decoder 310 performs an operation that inverts, or approximately inverts, the operation performed by the encoder 315, i.e., each of the first decoder 305 and the second decoder 310 decompresses data that it receives. Accordingly, "coding" and "compressing" (and related words, such as "encoding" and "encoded", and "compressed", respectively) are used interchangeably herein, as are "decoding" and "decompressing" (and related words, such as "decoded" and "unencoded", and "decompressed" and "uncompressed", respectively). Various methods of compression may be employed, including entropy coding, such as Huffman coding or arithmetic coding.

Figure 4:
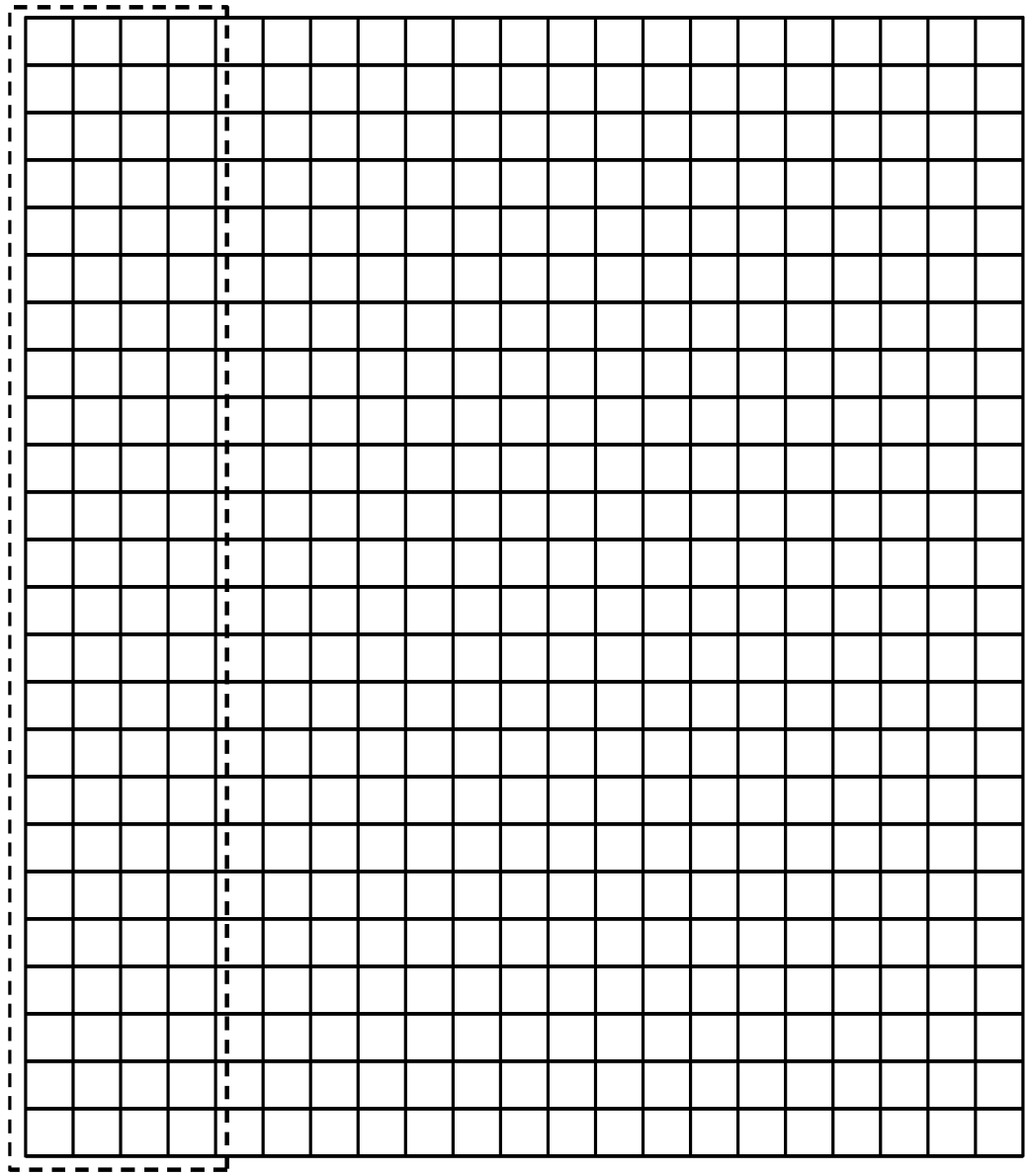
FIG. 4 is a schematic drawing of a portion of an image, according to an embodiment of the present disclosure.

Stress table data may be encoded and decoded in blocks referred to herein as "slices", each of which may in general be in arbitrary subset of the stress table. In some embodiments each slice corresponds to a square or rectangular region of the stress table, and to a square or rectangular region of the display panel. The square or rectangular region of the display panel may be referred to as a slice of the display, and the corresponding slice of the stress table data may be referred to as the stress profile of the slice of the display. Unless otherwise specified, a "slice", as used herein, refers to a slice of the stress profile. The horizontal dimension of the region of the display panel to which a slice corresponds may be referred to as the "slice width" and the vertical dimension may be referred to as the "line dimension" or "slice height". For example, as illustrated in FIG. 4, a slice may correspond to 4 lines and 24 columns of the display, i.e., it may have a slice width of 24 and a slice height of 4.

The size of the region of memory allocated to storing the compressed representation of each slice may be fixed or variable based on the compression algorithm used. In one embodiment it can be fixed and selected based on an estimated compression ratio for the coding method used. The compression ratio achieved in operation may vary, however, depending on, for example, the extent to which symbols are repeated in the uncompressed data. When the compression ratio achieved in operation is not sufficiently high to allow the compressed slice to fit within the region of memory allocated to storing the compressed representation of the slice, the raw data may be truncated (i.e., one or more of the least-significant bits of each data word may be removed) before compression is performed, to reduce the size, in memory, of the compressed representation of the slice, so that it will fit within the region of memory allocated to storing the compressed representation of the slice. In another embodiment, the required memory length can be calculated to cover the worst case scenario. In another embodiment, the length of compressed representation can be variable and it is stored in a Table or it is appended to the compressed data.

Figure 5:
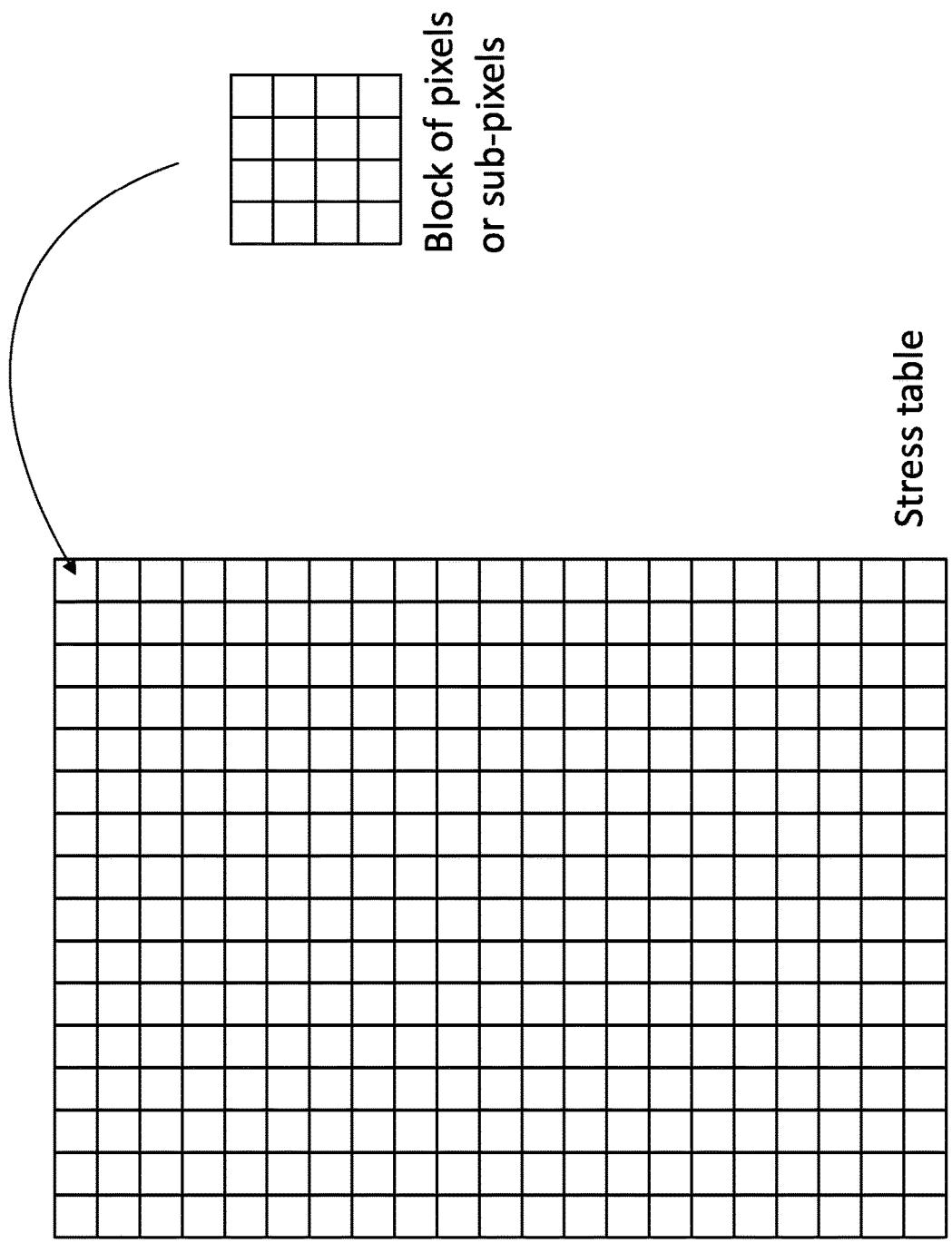
FIG. 5 is a schematic drawing of a portion of a stress table, according to an embodiment of the present disclosure.

The burden of tracking, and correcting for, sub-pixel stress may also (or instead) be reduced by averaging the data stored in the memory. For example, as illustrated in FIG. 5, in some embodiments each entry in the stress table, instead of representing the accumulated stress of a single sub-pixel, represents a function of the respective stresses experienced by a block (e.g., a 4×4 block, as shown) of pixels or sub-pixels. For example, the stress table entry storing the data for a 4×4 block may store the average, over the 4×4 block, of the luminance values of the pixels, or it may store the average of the components (i.e., the average of the stress of all of the 48 sub-pixels in the 4×4 block, or three elements of the stress table may store respective averages, over the 4×4 block, of the red, green, and blue pixels in the 4×4 block.

A decompressed representation of a slice of the stress table (after compression and decompression) may differ from the uncompressed representation of the slice (before being compressed), due to compression and decompression errors, for example, if a lossy compression is used or if truncation is performed, as described above, then, even if a lossless compression method (such as Huffman coding or arithmetic coding) is employed. If the stress data of a slice are decompressed before being augmented and then compressed again in the same manner each time the stress data are augmented with newly sampled adjusted drive current values, then such discrepancies may accumulate disproportionately in some data words. Accordingly, it may be advantageous to employ measures to counter such uneven accumulation of errors due to truncation, to reduce the likelihood that the accumulated errors will cause unacceptable or overcompensation of image quality.

Figure 6:
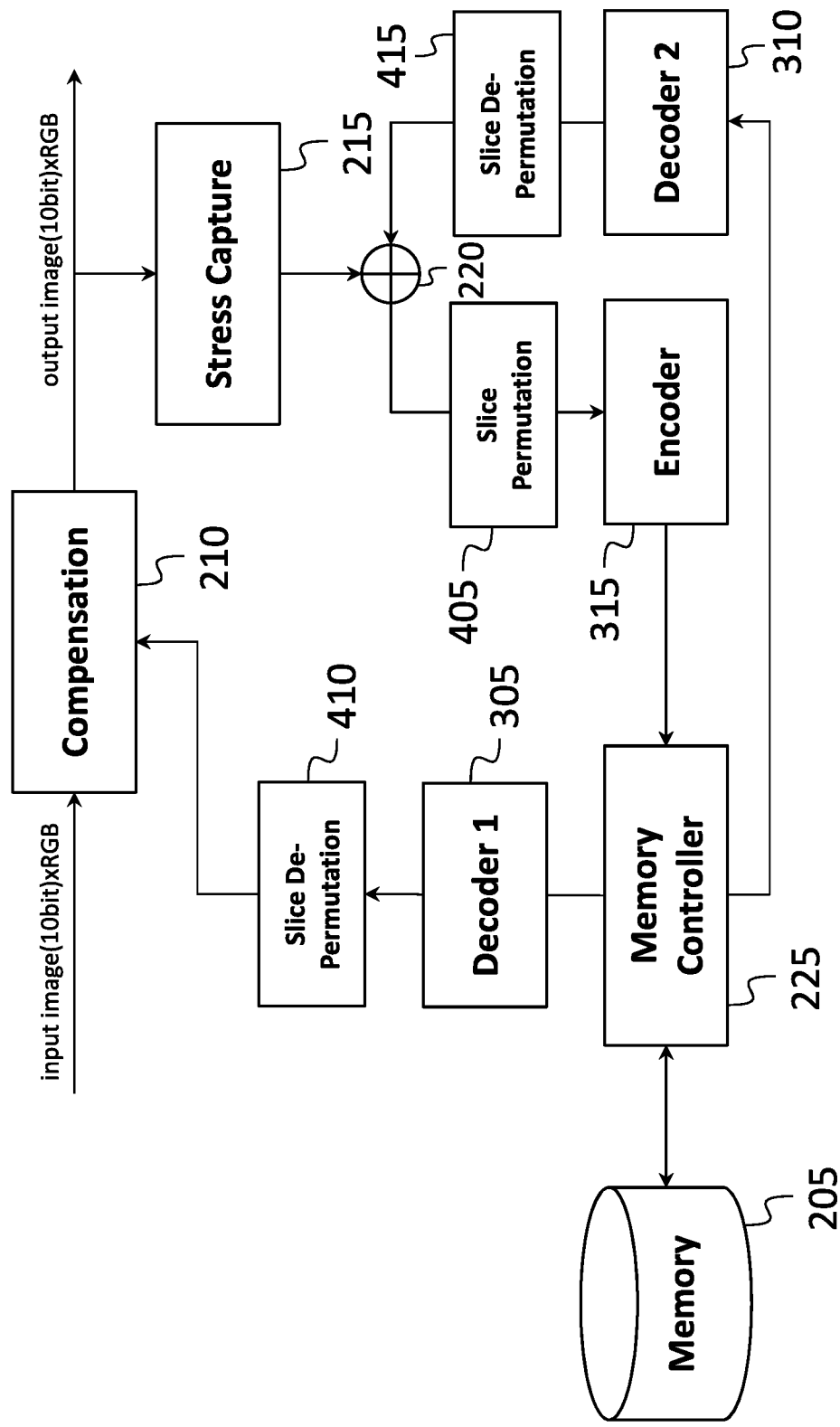
FIG. 6 is a block diagram of a system for stress compensation with compression, according to an embodiment of the present disclosure.

In some embodiments, permutations are employed to distribute the compression errors within the slices, and to avoid an accumulation of such errors in a value, or in a small number of values, in each slice. FIG. 6 shows a block diagram for implementing this method, in some embodiments. A slice permutation circuit 405 applies a first permutation to the stress data of a slice before the slice is encoded by the encoder 315. After any compressed slice is decoded by the first decoder 305, a first slice de-permutation circuit 410 applies a second permutation to the output of the first decoder 305, the second permutation being an inverse of the first permutation so that the output of the first slice de-permutation circuit 410 is the same as, or nearly the same as (differing, for example, by discrepancies resulting from truncation, as discussed above), the uncompressed slice data that were processed by the slice permutation circuit 405 and by the encoder 315 to form the compressed slice. Similarly, after any compressed slice is decoded by the second decoder 310, a second slice de-permutation circuit 415 applies the second permutation to the output of the second decoder 310, so that the output of the second slice de-permutation circuit 415 is the same as, or nearly the same as, the uncompressed slice data that were processed by the slice permutation circuit 405 and by the encoder 315 to form the compressed slice.

Figure 7:
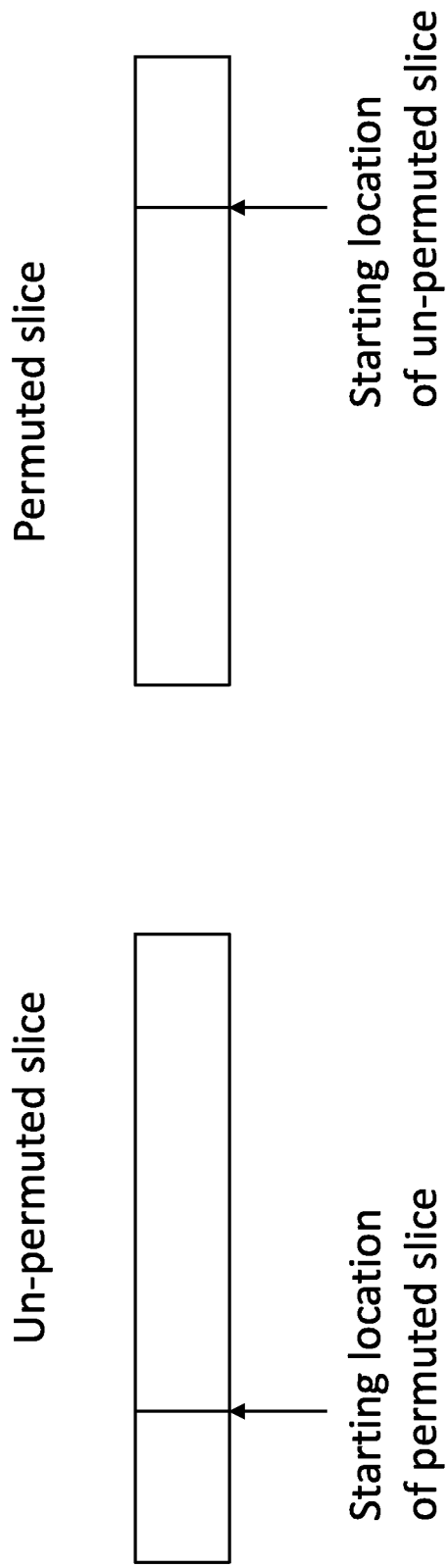
FIG. 7 is an illustration of a permutation, according to an embodiment of the present disclosure.

Various permutations may be employed. For example, in some embodiments, the permutation applied by the slice permutation circuit 405 (which may be referred to as the "forward permutation" to distinguish it from the inverse permutation) is a circular shift beginning from a starting location in the slice. Referring to FIG. 7, in such an embodiment, the input, for a slice, to the slice permutation circuit 405 may be a first sequence of stress values, the first value in the first sequence being the first stress value in the slice, the second value in the first sequence being the second stress value in the slice, and so on, i.e., the first sequence may consist of all of the stress values of the slice, in order. If the starting location is the n-th location in the slice, then the output of the slice permutation circuit 405 may be a second sequence of stress values, the first value in the second sequence being the n-th stress value in the slice, the second value in the second sequence being the n+1-th stress value in the slice, and so on, until the output equals the last stress value in the slice. The next output value after the last stress value in the slice may then be the first stress value in the slice, followed by the second stress value in the slice, and so on until the output equals the stress value preceding, in the slice, the n-th stress value in the slice, at which point the outputting of the permutation is complete, each element of the slice having been output by the slice permutation circuit 405. As such, the starting location determines the amount of the shift; if the starting location is one, then the permutation leaves the order unchanged, i.e., the amount of the circular shift is zero. In general, the amount of the circular shift may be one less than the starting location. The starting point may be selected randomly (e.g., based on a pseudorandom number generated by a pseudorandom number generator), each time the slice permutation circuit 405 performs a permutation operation, or it may be selected to increase or decrease in uniform increments, e.g., by one position (i.e., by the size of one stress value) each time the same slice is compressed, or by a number of positions selected so that the number of stress values in the slice and the number of positions are coprime.

In one embodiment, the starting point may be selected randomly (e.g., based on a pseudorandom number generated by a pseudorandom number generator), each time the slice permutation circuit 405 performs a permutation operation on the first slice. For the rest of the slices, the starting point can be calculated based on a fixed equation or pattern or location of the slice based on the first selected randomly starting point. For example, the amount of a circular shift for a j-th slice may be given by A1+j B mod NS where A1 is the (e.g., pseudorandom) amount of the circular shift of the first slice, B is a constant, and NS is the slice length in an image. The value j ranges from 1 to the number of slices, which may be 120, for example. The slice length may be the number of pixels in the slice or the number of pixels in the slice divided by an averaging size, if averaging within a slice is used.

In one embodiment, the stress profile is a first stress profile for a first slice of the display, the permuted stress profile is a first permuted stress profile, the compressed permuted stress profile is a first compressed permuted stress profile, the decompressed permuted stress profile is a first decompressed permuted stress profile, the decompressed stress profile is a first decompressed stress profile, and the method includes: permuting elements of a second stress profile for a second slice of the display, with a third permutation, to form a second permuted stress profile; compressing the second permuted stress profile to form a second compressed permuted stress profile; decompressing the second compressed permuted stress profile to form a second decompressed permuted stress profile; and permuting elements of the second decompressed permuted stress profile, with a fourth permutation, to form a second decompressed stress profile, the fourth permutation being an inverse of the third permutation, wherein the third permutation is a circular shift by an amount calculated from the pseudorandom amount. Although only two slices are mentioned in this paragraph, the number of slices may be more than two, and may, for example, be 120.

The inverse permutation may be a circular shift having a starting location that is the difference between the number of stress values in the slice and the starting location of the permutation. Accordingly, the starting location of the inverse permutation may be calculated (e.g., by the first slice de-permutation circuit 410 or by the second slice de-permutation circuit 415) from the starting location of the forward permutation, which may be, for example, stored with the encoded data, or generated, at the time of decoding, by a second pseudorandom number generator that generates the same sequence of pseudorandom numbers (the second pseudorandom generator being initialized to generate numbers suitably offset in time).

Figure 8:
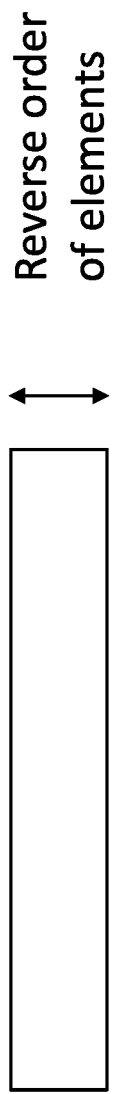
FIG. 8 is an illustration of a permutation, according to an embodiment of the present disclosure.

In other embodiments, referring to FIG. 8, the forward permutation is an up-down switch, i.e., a reversal of the order of elements in the direction perpendicular to the lines of the display. The inverse permutation in this embodiment is the same as the forward permutation, i.e., another reversal of the order of elements. In some embodiments the permutation is applied every other time that the slice is encoded; in other embodiments the permutation is applied to randomly selected occasions, e.g., on each occasion that the slice is encoded and that a pseudorandom bit generator, such as a linear feedback shift register, generates a bit having a value of one. Equivalently, an identity permutation (i.e., a permutation that leaves the order of the elements unchanged) is performed (instead of a non-identity permutation) when the pseudorandom bit generator generates a bit having a value of zero.

Figure 9:
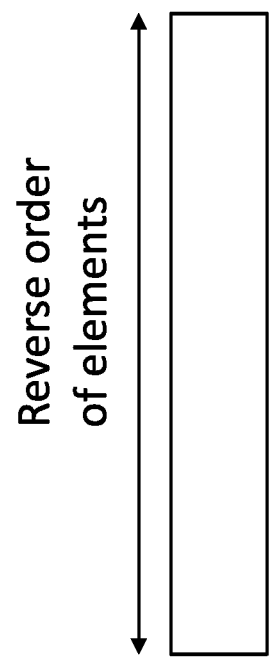
FIG. 9 is an illustration of a permutation, according to an embodiment of the present disclosure.

In other embodiments, referring to FIG. 9, the forward permutation is a right-left switch, i.e., a reversal of the order of elements in the direction parallel to the lines of the display. The inverse permutation in this embodiment is the same as the forward permutation, i.e., another reversal of the order of elements. In some embodiments the permutation is applied every other time that the slice is encoded; in other embodiments the permutation is applied to randomly selected occasions.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for permutation based stress profile compression have been specifically described and illustrated herein, many modifications and variations will be apparent to those skilled in the art. Accordingly, it is to be understood that a system and method for permutation based stress profile compression constructed according to principles of this disclosure may be embodied other than as specifically described herein. The invention is also defined in the following claims, and equivalents thereof.

What is claimed is:

1. A method for operating a display, the method comprising:
   permuting elements of a stress profile for a slice of the display, with a first permutation, to form a permuted stress profile;
   compressing the permuted stress profile to form a compressed permuted stress profile;
   decompressing the compressed permuted stress profile to form a decompressed permuted stress profile; and
   permuting elements of the decompressed permuted stress profile, with a second permutation, to form a decompressed stress profile, the second permutation being an inverse of the first permutation, wherein the compression is a lossy compression.

2. The method of claim 1, wherein the first permutation is a circular shift.

3. The method of claim 2, wherein the first permutation is a circular shift by a constant amount.

4. The method of claim 1, wherein the first permutation is a circular shift by a pseudorandom amount.

5. The method of claim 4, further comprising:
   storing the compressed permuted stress profile in a memory, and
   storing the pseudorandom amount in the memory.

6. The method of claim 4, further comprising:
   generating the pseudorandom amount by a first pseudorandom number generator;
   permuting elements of the stress profile, with the first permutation, based on the pseudorandom amount generated by the first pseudorandom number generator;
   generating the pseudorandom amount by a second pseudorandom number generator; and
   permuting elements of the decompressed permuted stress profile, with the second permutation, based on the pseudorandom amount generated by the second pseudorandom number generator.

7. The method of claim 4, wherein:
   the stress profile is a first stress profile for a first slice of the display,
   the permuted stress profile is a first permuted stress profile,
   the compressed permuted stress profile is a first compressed permuted stress profile,
   the decompressed permuted stress profile is a first decompressed permuted stress profile,
   the decompressed stress profile is a first decompressed stress profile,
   the method further comprising:
   permuting elements of a second stress profile for a second slice of the display, with a third permutation, to form a second permuted stress profile;
   compressing the second permuted stress profile to form a second compressed permuted stress profile;
   decompressing the second compressed permuted stress profile to form a second decompressed permuted stress profile; and
   permuting elements of the second decompressed permuted stress profile, with a fourth permutation, to form a second decompressed stress profile, the fourth permutation being an inverse of the third permutation,
   wherein the third permutation is a circular shift by an amount calculated from the pseudorandom amount.

8. The method of claim 1, wherein the first permutation is a reversal of order of elements of the stress profile.

9. The method of claim 8, wherein the reversal of order of elements of the stress profile is a reversal of order in a direction parallel to lines of the display.

10. The method of claim 1, wherein the first permutation is:
    a reversal of order of elements of the stress profile when a randomly generated bit has a value of one, and
    an identity permutation when the randomly generated bit has a value of zero.

11. A system for performing stress compensation in a display, the system comprising:
    a memory; and
    a processing circuit configured to:
      permute elements of a stress profile for a slice of the display, with a first permutation, to form a permuted stress profile;
      compress the permuted stress profile to form a compressed permuted stress profile;
      decompress the compressed permuted stress profile to form a decompressed permuted stress profile; and
      permute elements of the decompressed permuted stress profile, with a second permutation, to form a decompressed stress profile, the second permutation being an inverse of the first permutation, wherein the compression is a lossy compression.

12. The system of claim 11, wherein the first permutation is a circular shift.

13. The system of claim 12, wherein the first permutation is a circular shift by a constant amount.

14. The system of claim 12, wherein the first permutation is a circular shift by a pseudorandom amount, wherein the processing circuit is further configured to:
    store the compressed permuted stress profile in the memory, and
    store the pseudorandom amount in the memory.

15. The system of claim 14, wherein the processing circuit is further configured to:
    generate the pseudorandom amount by a first pseudorandom number generator;
    permute elements of the stress profile, with the first permutation, based on the pseudorandom amount generated by the first pseudorandom number generator;
    generate the pseudorandom amount by a second pseudorandom number generator; and
    permute elements of the decompressed permuted stress profile, with the second permutation, based on the pseudorandom amount generated by the second pseudorandom number generator.

16. The system of claim 11, wherein the first permutation is a reversal of order of elements of the stress profile.

17. The system of claim 16, wherein the reversal of order of elements of the stress profile is a reversal of order in a direction parallel to lines of the display.

18. The system of claim 11, wherein the first permutation is:
- a reversal of order of elements of the stress profile when a randomly generated bit has a value of one, and
- an identity permutation when the randomly generated bit has a value of zero.

19. A display, comprising:
- a display panel;
- a memory; and
- a processing circuit configured to:
    - permute elements of a stress profile for a slice of the display, with a first permutation, to form a permuted stress profile;
    - compress the permuted stress profile to form a compressed permuted stress profile;
    - decompress the compressed permuted stress profile to form a decompressed permuted stress profile; and
    - permute elements of the decompressed permuted stress profile, with a second permutation, to form a decompressed stress profile, the second permutation being an inverse of the first permutation, wherein the compression is a lossy compression.

20. The display of claim 19, wherein the first permutation is a circular shift.

* * * * *